United States Patent [19]
Froeberg et al.

[11] Patent Number: 6,028,550
[45] Date of Patent: Feb. 22, 2000

[54] VEHICLE GUIDANCE SYSTEM USING SIGNATURE ZONES TO DETECT TRAVEL PATH

[75] Inventors: Peter L. Froeberg; Scott R. Smith, both of Cupertino; James Sotelo, Scotts Valley, all of Calif.

[73] Assignee: Trimble Navigation Limited, Sunnyvale, Calif.

[21] Appl. No.: 08/907,763

[22] Filed: Aug. 8, 1997

[51] Int. Cl.$^7$ .............................. H04B 7/185; G01S 5/02
[52] U.S. Cl. .................... 342/357.13; 701/209; 701/210; 455/422
[58] Field of Search .......................... 342/357.13, 357.09, 342/357.1; 701/209, 210; 455/422

[56] References Cited

U.S. PATENT DOCUMENTS 5,845,227 12/1998 Peterson .................................. 701/209

*Primary Examiner*—Theodore M. Blum
*Attorney, Agent, or Firm*—Wagner, Murabito & Hao LLP

[57] ABSTRACT

A system and method for determining which of a plurality of travel paths is taken by vehicles through area in which the performance of an automatic vehicle location (AVL) system is reduced. In one embodiment, the present invention divides a geographic region into a plurality of signature zones which are further divided into a plurality of signature zone cells. The signature zone cells in each signature zone correspond to travel paths that pass through an area having structures that prevent reception of GPS signals or any area where GPS alone is not sufficient to discern travel path. The present automatic vehicle path determination system then calculates correlation values for positions in each signature zone cell that correspond to the travel paths that pass through the signature zone. The position of each vehicles is monitored by an automatic vehicle location (AVL) system. The present automatic vehicle path determination system then determines the path taken by each vehicle passing through the signature zone. The present invention then communicates to the CAD system the path taken by each vehicle. Thus, the present invention provides a system which automatically determines which path is taken by a vehicle entering an area having structures that prevent reception of GPS signals, a system which can function in conjunction with an existing AVL or CAD system, and a system which reduces CAD system operator decision making processes.

19 Claims, 8 Drawing Sheets

VEHICLE GUIDANCE SYSTEM USING SIGNATURE ZONES TO DETECT TRAVEL PATH

TECHNICAL FIELD

This invention relates to vehicle tracking and automatic vehicle location systems. Specifically, the present invention relates to vehicle tracking in areas where the reception of satellite signals is obstructed or in any area where GPS alone is not sufficient to discern travel path.

BACKGROUND ART

Vehicle tracking using an automatic vehicle location (AVL) system is well known in the art. In a typical AVL system, each of a plurality of vehicles communicates its position to a base station. The position of each of the vehicles is commonly superimposed over a simplified map to provide a graphical display of the position of the vehicles with respect to the underlying simplified map. An AVL system can also be used to dramatically enhance the function of a computer aided dispatch (CAD) system.

In one use of a CAD system, a system operator dispatches a courier vehicle to a reported location to pick up a passenger and to carry the passenger to a designated location such as a car rental agency office. For example, a operator using a CAD system receives a request that a passenger is to be picked up at a specific location. By accessing an AVL system, the CAD operator is able to visually determine which of the displayed vehicles is positioned near or nearest to the location of the caller. However, an AVL system cannot determine the exact position of the vehicle when the vehicle is in an area in which the vehicle is obstructed from receiving position locating signals. For example, when the vehicle is on a road, highway, bridge or parking lot that has multiple levels, an overlying level can prevent the vehicle from receiving position locating signals. Such as position locating signals include, for example, satellite based position locating signals of the Global Positioning System (GPS). Therefore, although an AVL system can enhance the functionality of a CAD system, a conventional AVL system can not always reliably determine which of a plurality of vehicles can respond most quickly to an event. The shortcomings of a combined AVL and CAD system are especially prevalent in an environment containing complex features such as airports. This limitation on AVL and CAD systems is particularly problematic for taxi services, car rental services, and other transportation services that operate extensively in airports. In an airport environment, for example, it is critical that the operator know whether the vehicle is at the level at which passengers depart (departure level) or whether the vehicle is at the level at which passengers arrive (arrival level). Other signal obstructing environments include, for example, overpasses, tunnels and bridges in large metropolitan areas such as San Francisco, New York, Los Angeles, Boston, and the like.

As mentioned above, environments that contain multi-level structures often include structures that block the reception of GPS signals. For example, when a vehicle is on any level other that the top level of a road, overpass or bridge, the upper levels block reception of GPS signals. In addition, in complex environments such as those which typically contain multi-level structures, even the top level of the structure usually contains obstructions such as bridge spans, cables, buildings, pylons and other similar structures which can block reception of GPS signals. Thus, when multi-level structures are encountered, prior art CAD systems or combined AVL and CAD systems often cannot determine the exact location of the vehicle even when the vehicle is on the top level of the structure. The CAD operator must decide which of a plurality of available vehicles can respond most quickly to an event. That is, the CAD operator must consider situations and conditions that will affect each vehicle during its travel route such as vehicle impeding barriers, traffic, geographic barriers, congestion and regularly occurring events when determining which vehicle to dispatch to the event. As a result of not knowing the precise location of all vehicles, CAD system operators may be forced to guess or estimate the exact location of a vehicle. To make matters even worse for CAD system or combined AVL and CAD system operators, dispatch decisions must be made under rigorous time constraints. Hence, even well trained CAD operators may mistakenly dispatch the wrong vehicle or a slower responding vehicle to a location.

Although an operator may be able to determine the level on which a vehicle is located by referencing a destination log of a particular vehicle, such a determination is simply an educated guess. Furthermore, due to time constraints, AVL and CAD system operators typically will not have the time to refer to the destination log prior to determining which vehicle to dispatch because of time constraints.

Furthermore, although signals from GPS position information can be used to determine the altitude of a particular vehicle, GPS systems often cannot calculate altitude with a high enough accuracy to determine whether a vehicle is on, for example, the first or second level of a multi-level structure. This is primarily due to the fact that vehicles typically receive from satellites located within a narrow range directly above the vehicle. It is difficult to receive satellite signals from satellites located near the horizon. Therefore, the error in the calculated altitude is high, particularly when structures limit the reception of satellite signals. In addition, the difference in height between different levels of multi-level structures is not great, typically ranging less than twenty feet. Thus, the difference in height is usually less than the error of the calculated altitude. Therefore, prior art GPS systems cannot reliably determine at which level of a multi level structure the vehicle is located, even when the vehicle is able to receive GPS signals.

In an attempt to solve problems associated with multi-level structures and nearly coincident roadways, recent prior art systems have used transponders, typically referred to as "signposts" located on each level of the multi-level structure. These signposts send a signal to the base station once the vehicle passes the signpost. The signpost indicates the level at which the vehicle is located. This solution is expensive since signposts must be installed at each level of each multi-level structure. For example, with respect to airports, a signpost must be installed at each departure level and at each arrival level of each terminal. Signposts also require power. Therefore, electrical cable, for example, must be run to each signpost. Signposts are unique to and separately owned by each AVL or CAD system. Thus, each different AVL and CAD system must install its own signposts that work with its vehicles and its particular AVL and CAD system. It has recently become much more difficult to obtain permission to install signposts. This is particularly true at airports due to the number of requests for new installations, and due to restrictions on radio frequency and mechanical clutter at airport locations. Permission to install a new signpost now takes months to obtain, and in some cases, permission is not granted at all.

Other methods which could be used to determine the path of a vehicle traveling through a multi-level structure include the use of altimeters and inclinometers. However, altimeters are expensive and they must be repeatedly re calibrated to reflect current atmospheric conditions. Inclinometers are difficult to use and they produce unreliable results.

Thus, a need exists for a system which swiftly and automatically determines the location of a vehicle when the vehicle is on a multi-level structure, a system which can function in conjunction with an existing AVL or CAD system, and a system which reduces CAD system operator decision making processes.

DISCLOSURE OF THE INVENTION

The present invention to provides a system which swiftly and automatically determines the location of a vehicle when the vehicle is on a multi-level structure, a system which can function in conjunction with an existing AVL or CAD system, and a system which reduces CAD system operator decision making processes.

The above accomplishment has been achieved by an automatic vehicle path determination (AVPD) system. Specifically, in one embodiment, the present invention establishes a signature zone adjoining each area in which the performance of said AVL system is reduced. These signature zones are geographic regions that lie along travel routes that diverge prior to entering into multi-level structures. Location coordinates are determined for signature zone cells that lie within each signature zone and which correspond to travel paths within the signature zone. By analyzing location information received from a vehicle passing through a signature zone, the vehicle's travel path is determined. This analysis involves comparing values in a matrix which includes correlation data corresponding to locations within each cell. The correlation data indicates how closely a vehicle is tracking a particular path. Prior to divergence, a vehicle may be tracking two different paths. However, as the paths diverge, the vehicle will track one path more closely than the other until such time that it may be determined which of the two paths is being taken. This determination is made by analysis of vehicle position information corresponding to positions located within individual cells. In addition, after a vehicle has traveled through more than one cell, the position information corresponding to positions within each of the different cells through which the vehicle has traveled is correlated to more accurately determine travel path. Alternatively, mathematical calculations may be used instead of look-up-tables to compute how closely a vehicle is tracking a particular path.

The present automatic vehicle path determination system then calculates a path for the vehicle. The position of each of the plurality of vehicles is monitored by an automatic vehicle location (AVL) system. Upon the detection that a vehicle has entered into a signature zone, the present automatic vehicle path determination system then determines which of the paths is taken by the vehicle and the path is communicated to a computer aided dispatch (CAD) system either directly or through the AVL system. Thus, the present invention provides a system which automatically determines which of a plurality of paths is taken by a vehicle approaching a multi-level structure, a system which can function in conjunction with an existing AVL or CAD system, and a system which reduces CAD system operator decision making processes.

In the present invention, speed and direction values are also used to determine travel path. The use of speed and direction allows for the accurate determination of travel path when the travel paths in a signature zone do not sufficiently diverge so as to allow for a conclusive determination of the travel path taken by analysis of position information.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
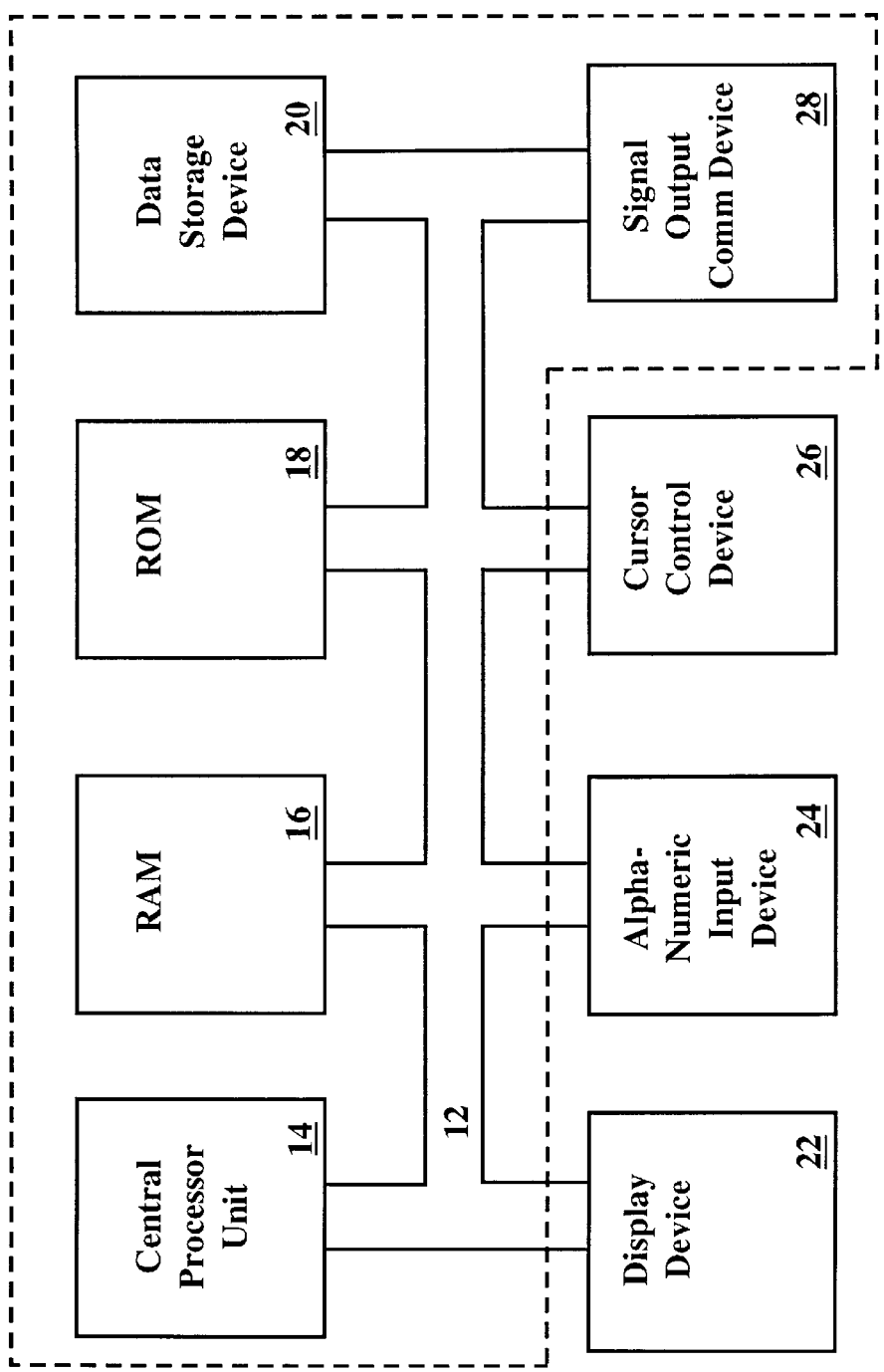
FIG. 1 is a schematic diagram of an exemplary computer system used as a part of a computer aided dispatch (CAD) system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

With reference now to FIG. 1, portions of the present automatic vehicle path determination system are comprised of computer executable instructions which reside in a computer system. FIG. 1 illustrates an exemplary computer system 1 used as a part of a computer aided dispatch (CAD) system in accordance with the present invention. In the present embodiment, CAD system 1 has AVL capabilities. The AVL portion of CAD system 1 allows CAD system 1 to track and monitor the position of vehicles which may be dispatched. It is appreciated that the CAD system 1 of FIG. 1 is exemplary only and that the present invention can operate within a number of different computer systems other than CAD systems including general purpose computers systems, embedded computer systems, and stand alone computer systems specially adapted for automatically monitoring the position of vehicles such that vehicles may be effectively dispatched to particular locations.

CAD system 1 of FIG. 1 includes an address/data bus 12 for communicating information, a central processor unit 14 coupled to bus 12 for processing information and instructions. CAD system 1 also includes data storage features such as a random access memory 16 coupled to bus 12 for storing information and instructions for central processor unit 14, a read only memory 18 coupled to bus 12 for storing static information and instructions for the central processor unit 14, and a data storage device 20 (e.g., a magnetic or optical disk and disk drive) coupled to bus 12 for storing information and instructions. CAD system 1 of the present embodiment also includes a display device 22 coupled to bus 12 for displaying information (e.g., a map showing the position of vehicles and latitude, longitude, elevation, time, speed, heading information and path identifier) to a CAD operator. An alphanumeric input device 24 including alphanumeric and function keys is coupled to bus 12 for communicating information and command selections to central processor unit 14. CAD system 1 also includes a cursor control device 26 coupled to bus 12 for communicating user input information and command selections to central processor unit 14, and a signal input output communication device 28 (e.g. a modem) coupled to bus 12 for communicating command selections to central processor unit 14.

Display device 22 of FIG. 1, utilized with CAD system 1 of the present invention, may be a liquid crystal device, cathode ray tube, or other display device suitable for creating graphic images and alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Figure 2:
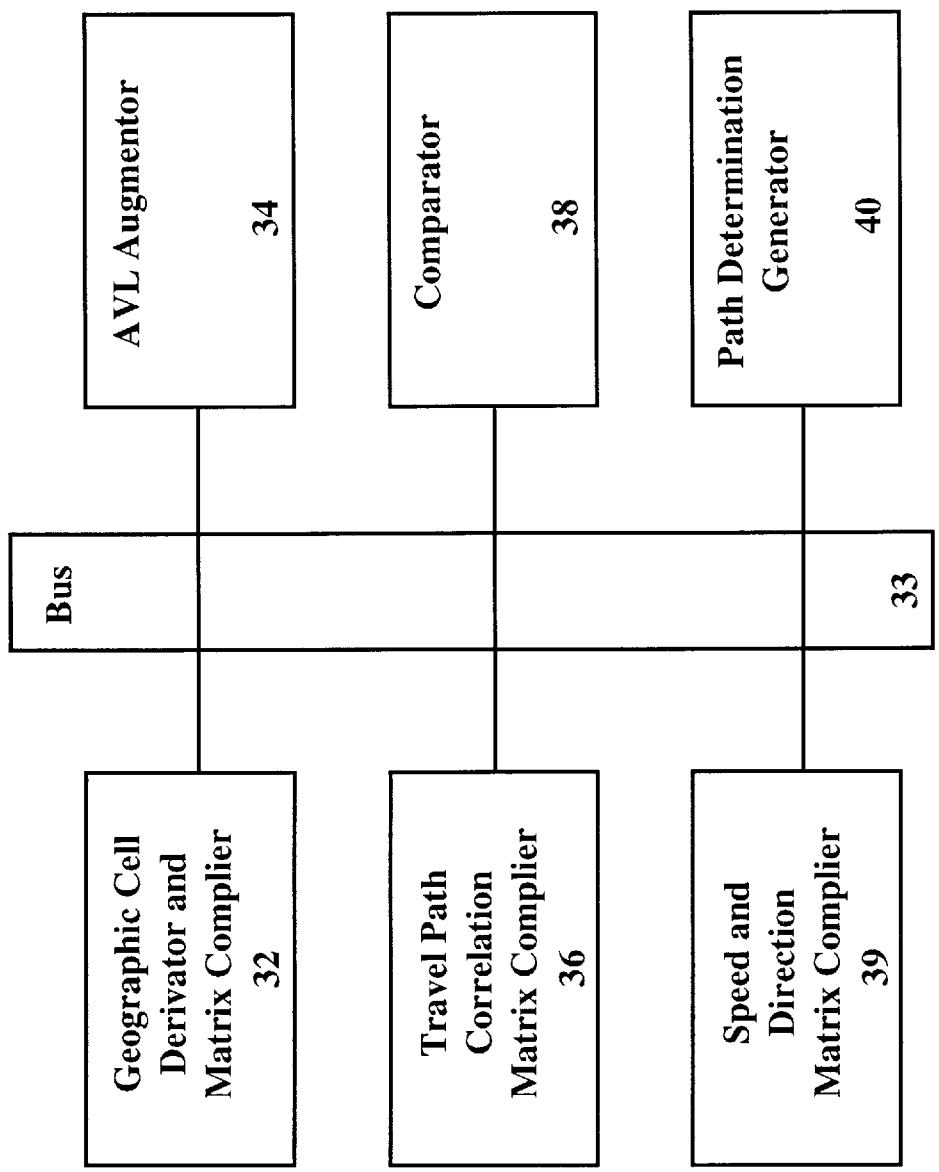
FIG. 2 is a logical representation of components of one embodiment of an automatic vehicle path determination system in accordance with the present claimed invention.

FIG. 2 is a logical representation of components of the present automatic vehicle path determination system. These components include signature zone cell derivator 32, AVL augmentor 34, travel path correlation matrix compiler 36, comparator 38, speed and direction matrix compiler 39, and vehicle path determination generator 40 which are connected via bus 33. In the present embodiment, signature zone cell derivator 32, AVL augmentor 34, vehicle travel path matrix compiler 36, comparator 38, speed and direction matrix compiler 39, and path determination generator 40 are implemented as executable instructions within CAD system 1 of FIG. 1. A more detailed discussion of the components of the present invention and the steps performed by the components is found below.

General Description of Trajectory Determining Process of the Present Invention

Figure 3:
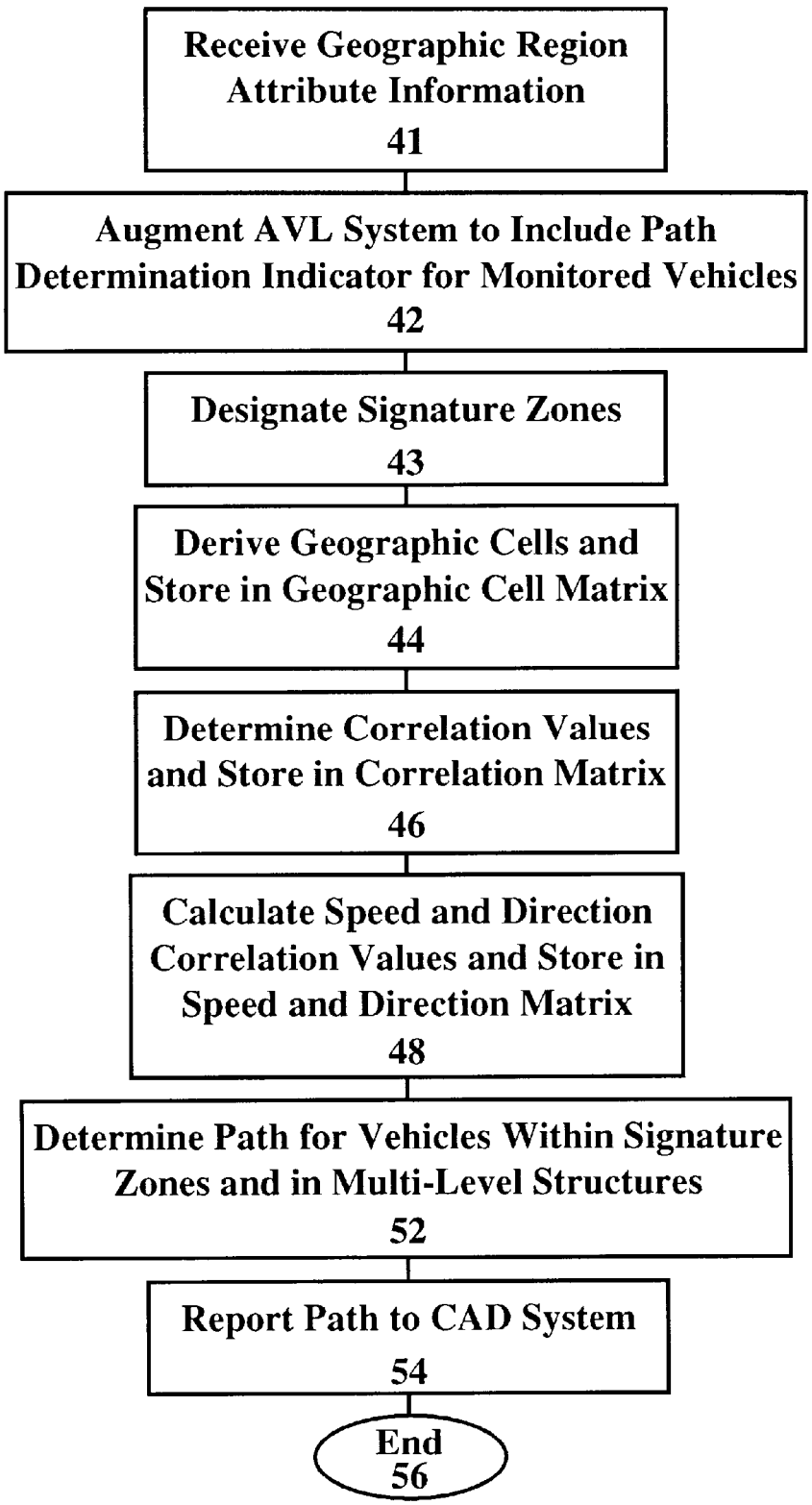
FIG. 3 is a flow chart illustrating steps employed by the automatic vehicle path determination system in accordance with the present claimed invention.

With reference next to FIG. 3, a flow chart illustrating steps employed by the automatic vehicle path determination (AVPD) process of the present invention is shown. During use of the present invention, an event such as, for example, the need for the pickup of a passenger at a terminal of an airport is reported to an operator of a CAD system. The present AVPD invention then indicates the travel paths of vehicles approaching multi-level structures. The present AVPD invention also indicates the travel path during the entire time that the vehicle is traveling through the multi-level structure. Thus, the travel path is indicated until such time that a position indication is received from the vehicle indicating that the vehicle has left the multi-level structure. The CAD system operator may activate the present AVPD invention by, for example, pushing an "AVPD" marked button. Alternatively a pull-down menu on the operators display device could be used to select "AVPD" and the AVPD system will operate until it is turned off. The automatic vehicle path determination system of the present invention is described in detail below.

In step 41 of FIG. 3, the present AVPD system receives geographic region attribute information to be analyzed by the present AVPD system. The geographic attribute information includes the locations of multi-level pathways such as overpasses, bridges, and multi-level structures at airport terminals. The geographic attribute information may include information on multi-level structures such as parking lots and underground tunnels. Geographical attribute information may include information on geographical regions (signature zones) along travel paths approaching multi-level structures. Alternatively, data items which are normally included in AVL data such as, for example, vector street map information, jurisdictional areas and boundaries, hydrographic features, railways, callbox locations and the like could also be included in geographic region attributes.

Vector street map information, also referred to as the transportation layer, may include, for example, the physical layout of roadways within the geographic region of interest, the type of roadways present, the allowed direction of traffic flow on the roadways, the location of intersections, speed limits for the various roadways, and the like. In the present automatic vehicle path determination system, the vector street map information may be either a proprietary data set or one purchased commercially.

GPS system accuracy plays a significant role in deriving signature zone cells. This is primarily a function of the equipment used at a particular region. For example, improved location determination is possible when using differential GPS techniques. Differential GPS techniques are well known in the art. Most AVL systems use differential GPS methods to determine location of vehicles. DGPS involves comparing the GPS signals received at a known location to GPS signals received by the monitored vehicles. By methods well known in the art, the location of the monitored vehicle is then corrected to take into account the measurements received at the known location. Using these techniques, vehicle location may be determined with sub meter accuracy. Factors such as obstructions, number of viewable satellites and radio reception affect GPS system accuracy. For example, in a downtown area with numerous tall buildings, vehicles may pass through areas where no location determination is possible. In other areas reception of only one or two satellites may be possible. However, using differential GPS techniques, location can be determined with varying levels of accuracy. The extent that these features influence signature zone cell derivation in the present AVPD system will, of course, vary from region to region. For example, structural features that affect GPS accuracy are much more of a factor in major cities such as San Francisco, Boston and Chicago than in smaller cities that do not have numerous large structures.

Geographic structure of pathways within signature zones is also an important factor in the signature zone cells derivation process of the present invention. For example, some pathways widely diverge and some pathways narrowly diverge. Geographic structure information includes the distance from the point of divergence to the first obstruction (length of divergence) and the distance between the pathways (width of divergence). The distance between the point of divergence and the first obstruction affects the number of position signals that can be observed. The width of divergence determines whether or not the resolution of the GPS system is adequate to accurately determine the pathway taken by a particular vehicle. Because each different pathway has a different length of divergence and width of divergence as the pathways approach the multi-level structure, some paths will sufficiently diverge so as to allow for easy differentiation. Other pathways may be difficult to discern because the length of divergence is not sufficient or because the width of divergence is not sufficient. Like GPS accuracy information, geographic structure of pathways may be include in the geographic region attribute information or may be input separately.

Speed limits may also be used in the signature zone cell derivation process of the present invention. For example, if a signature zone has a low speed limit such as a airport terminal gate structure, more position samples may be taken from a vehicle passing through a signature zone having a given length of divergence. In addition the availability of speed and direction data from vehicles passing through a particular signature zone may affect the size and location of signature zones and signature zone cells.

With reference still to step 41 of FIG. 3, in the present invention, the geographic region attribute information is incorporated into a geographic information systems (GIS) database. In the present embodiment, the geographic region attribute information is incorporated into an ARC/INFO GIS database manufactured by Environmental Systems Research Institute (ESRI) of Redlands, California.

With reference next to step 42 of FIG. 3, AVL augmentor 34 of FIG. 2 supplements the AVL portion of CAD system 1 of FIG. 1 with the signature zone cell information stored in step 44. More specifically, AVL augmentor 34 assigns a path identifier to each vehicle monitored by the AVL system. AVL augmentor 34 incorporates a path identifier into the standard latitude, longitude, elevation, time, speed, and heading information provided by the AVL portion of CAD system 1. Thus, the AVL portion of CAD system 1 also reports the path taken by each monitored vehicle when a monitored vehicle passes through a signature zone, and the path is indicated until the vehicle either passes through the multi-level structure, or a subsequent position coordinate is received that indicates the actual position of the vehicle. Therefore, AVL augmentor 34 of the present invention functions as a server to the AVL system portion of CAD system 1.

As shown by step 43 of FIG. 3, after receiving geographic region attribute information and augmenting the AVL system, the present invention designates signature zones. The designation of signature zones establishes which structures will have designated paths in the AVPD system. Signature zones are designated regions that contain pathways that diverge so as to define distinct pathways that pass through multi-level structures. The boundaries of signature zones are determined using geographic structure information. Other factors such as the speed limits and the availability of speed and direction information may be used to determine the boundaries of signature zones. Signature zones may be designated manually and the size shape and location of each signature zone may be manually input into CAD system 1 via, for example alphanumeric input device 24 of FIG. 1. Alternatively, based on input from an operator, the size and shapes of signature zones may be calculated by CAD system 1.

With reference next to step 44 of FIG. 3, after the geographic region attribute information has been received, and after the boundaries of signature zones have been established, the present invention derives signature zone cells by dividing the signature zones into smaller areas. The present invention divides the signature zone into selected boundaries associated with the geographic region attribute information. More specifically, signature zone cells are established that conform to different travel paths that enter into the multi-level structure.

Figure 4:
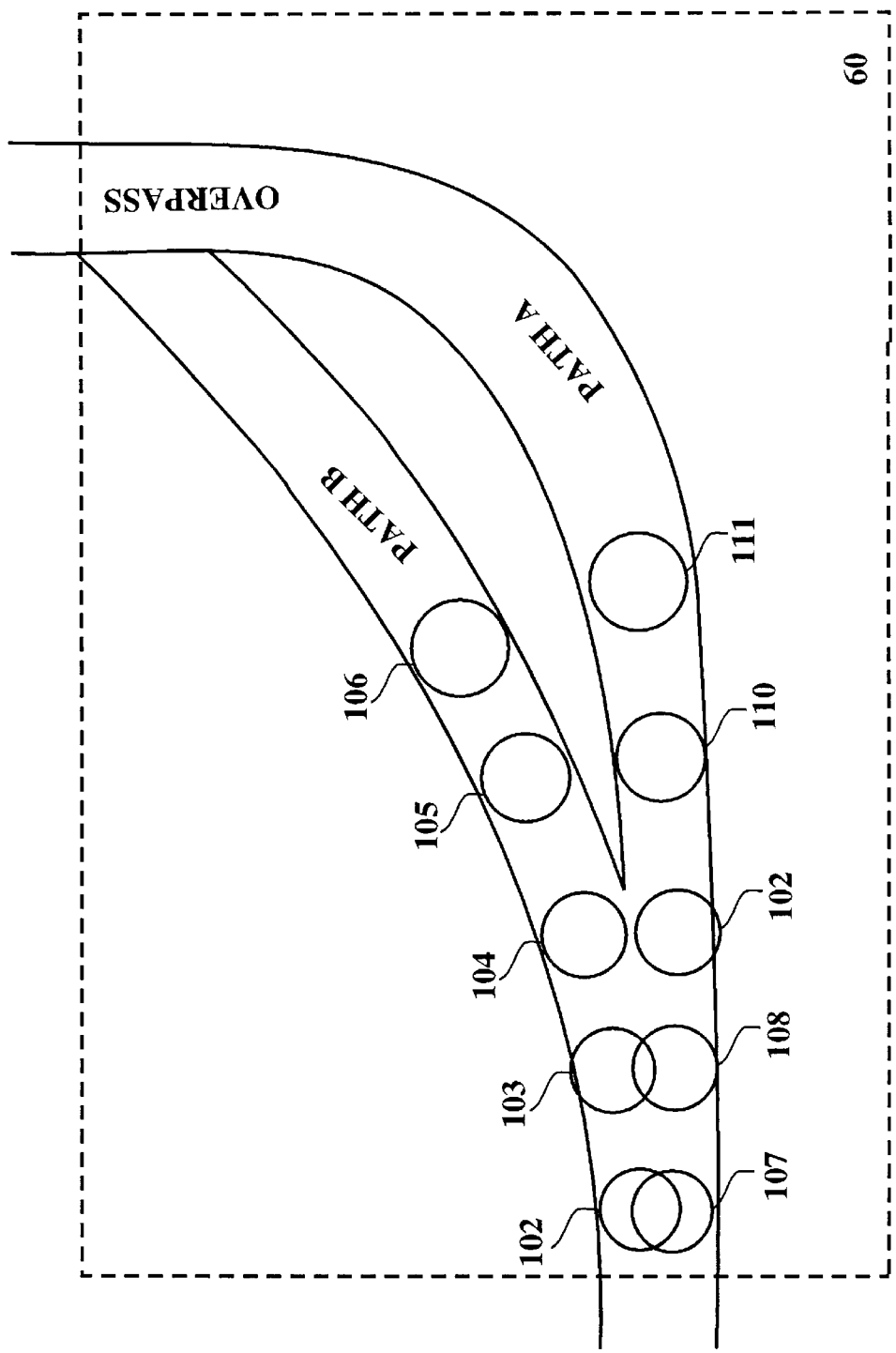
FIG. 4 is a schematic diagram illustrating a signature zone cell derivation process for a signature zone including two paths that widely diverge in an automatic vehicle path determination system in accordance with the present claimed invention.

With reference next to FIG. 4, an example of the signature zone cell derivation process recited in step 44 of FIG. 3 is shown. Signature zone cell derivator 32 of FIG. 2, utilizes the geographic region attribute information to partition signature zone 60 into signature zone cells 102–111. Cells 102–106 to differentiate travel along pathway B and cells 107–111 differentiate travel along pathway A. In the example shown in FIG. 4, the length and width of diversion between path B and path A allows for quick, easy and positive differentiation between the two paths prior to the convergence of the paths at the overpass. It will be understood that the exact partitioning of signature zone cells within signature zone 60 will be based upon the location and arrangement of the pathways leading to the multi-level structure. Furthermore, the partitioning process will vary for each signature zone based upon the location and arrangement of pathways and other factors considered during signature zone cell derivation process 44. Other information such as speed limits and the availability of speed and direction information may also be considered.

Figure 5:
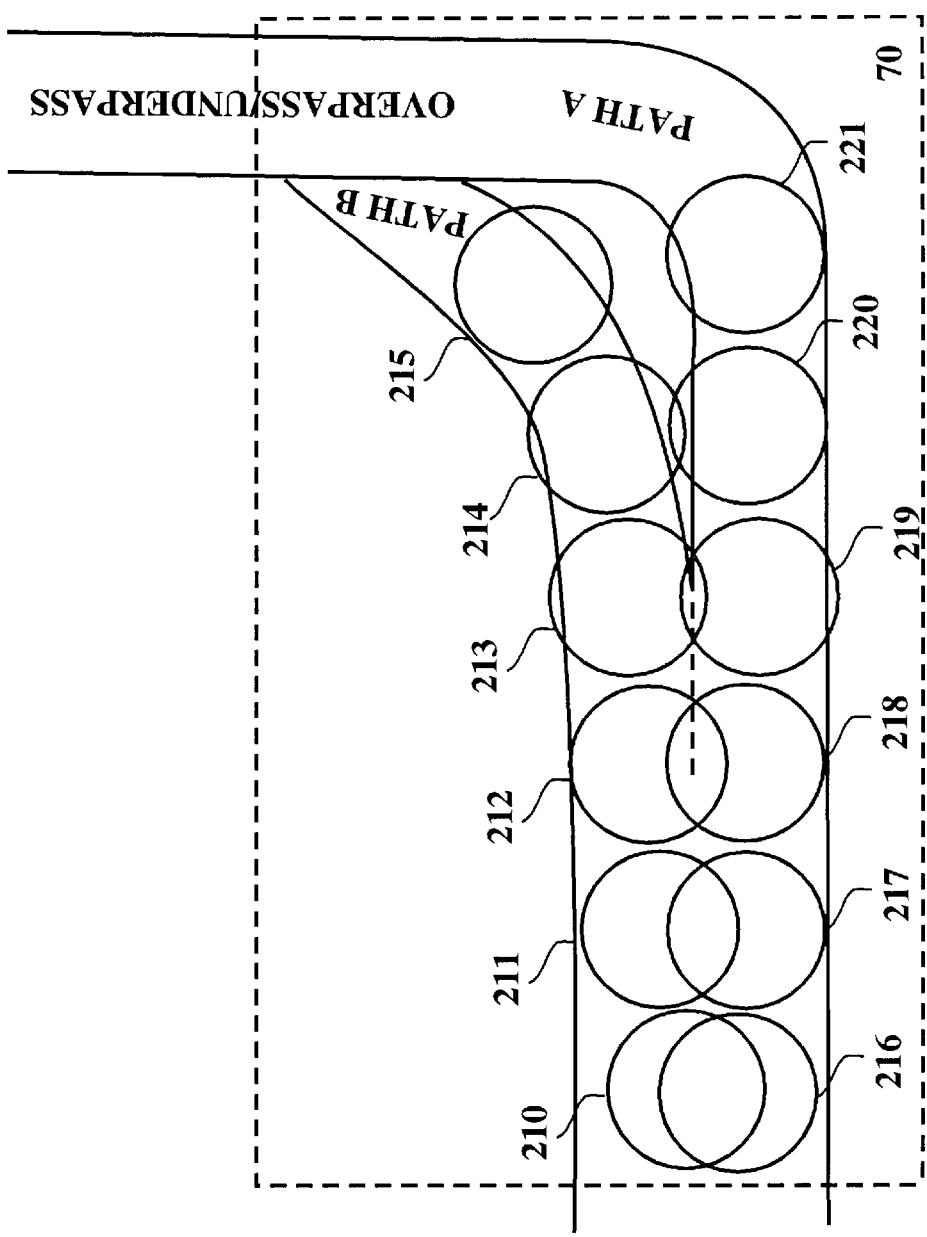
FIG. 5 is a schematic diagram illustrating a signature zone cell derivation process for a signature zone including two paths that narrowly diverge in an automatic vehicle path determination system in accordance with the present claimed invention.

With reference next to FIG. 5, in the present embodiment signature zone 70 is then partitioned into signature zone cells 210–221 by signature zone cell derivator 32. The length of divergence between pathway A and pathway B in signature zone 70 is significantly less than the length and width of divergence of signature zone 60 shown in FIG. 4. Only cells 213–215 and 219–221 are located within the length of divergence. However, since only a limited number of signature zone cells may be located within the length of divergence due to the short length of the divergence, cells 210–212 and 216–218 are also used to differentiate between travel along path A or path B. Cells 210–215 which distinguish path B overlap cells 216–221 which distinguish path B. Thus, location information from a vehicle may fall into both a cell which corresponds to one path and a cell which corresponds to a different path.

Figure 6:
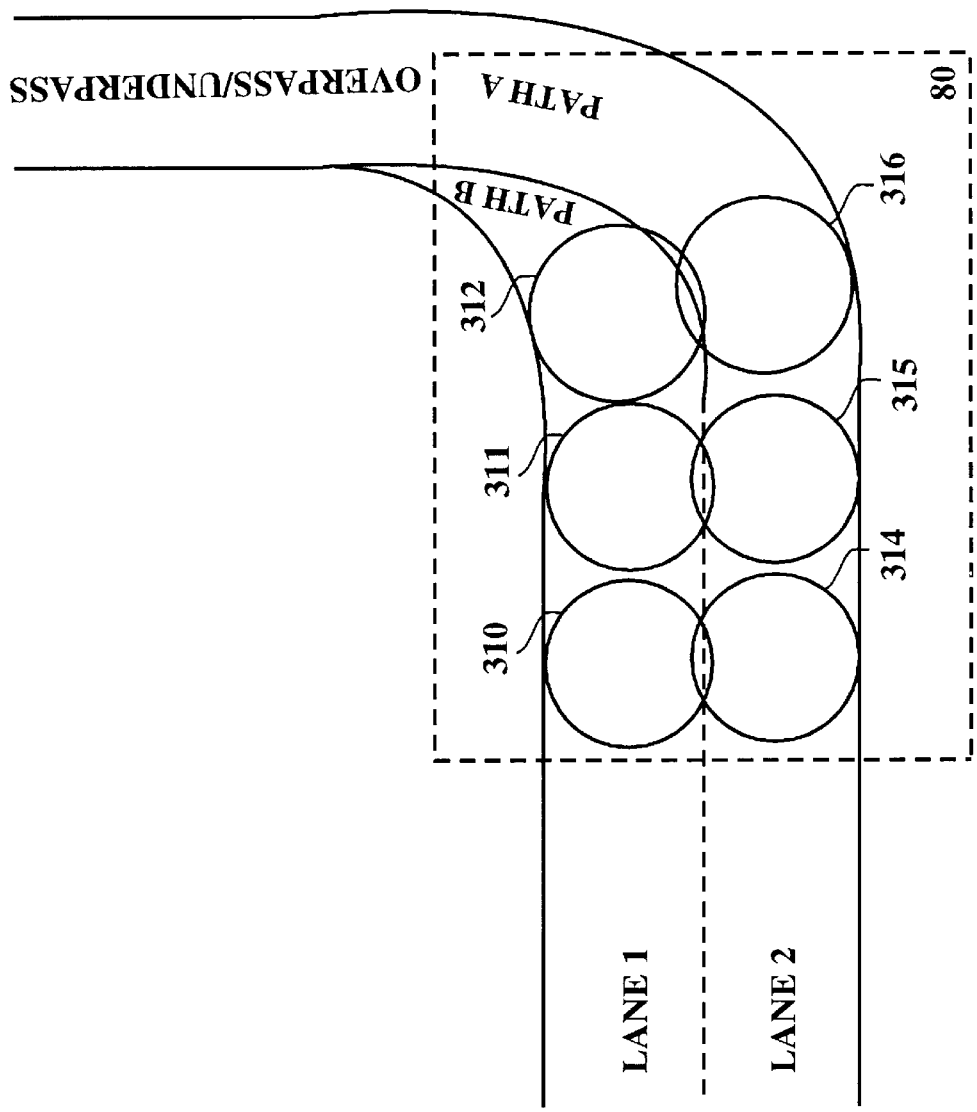
FIG. 6 is a schematic diagram illustrating a signature zone cell derivation process for a signature zone including two lanes that diverge into two paths in an automatic vehicle path determination system in accordance with the present claimed invention.

In the present embodiment, signature zone cell derivator 32 of FIG. 2 derives signature zone cells using derivation process of step 44 in FIG. 3 for the structure shown in signature zone 80 of FIG. 6. The length and width of the divergence shown in the example of FIG. 6 is not sufficient to determine the path taken prior to the entry of a vehicle into the overpass by using data received after the two paths diverge. Therefore, the paths are differentiated by cells located prior to the divergence. Cells 310–312 correspond to travel along Path A and cells 314–316 correspond to travel along path B. Since a vehicle may change lanes at any time prior to the diversion, there is no need to locate cells along lane 1 prior to cells 310 or along lane 2 prior to cell 314. In a signature zone such as signature zone 80, since differentiation between travel paths is difficult due to the possibility that a vehicle may change lanes at the last possible moment, variables such as velocity and direction vectors may also be used to determine the path taken. The centerline of each lane may be used to position the center or nucleus of a signature zone cell such as cells 310–312 which are positioned along the centerline of lane 1 and cells 314–316 which are positioned along the centerline of lane 2.

Referring now back to FIG. 3, in the present embodiment signature zone cell derivator 32 of FIG. 2 continues the signature zone cell derivation process of step 44 for each of the signature zones designated in step 43. Although signature zone cells are derived within designated signature zones as described above and as illustrated in FIGS. 4–6, the present invention is also well suited to deriving signature zone cells from signature zones using various other variables and constraints which may be specific to a particular signature zone or a particular type of multi-level structure. Such derivation may include the use of any combination of the above-mentioned cell derivation methods. Alternatively, signature zone cells may be determined manually or by experimentation with a particular signature zone. Once the size and location of each signature zone cell is derived, a representation of the cell such as center coordinates and radius for a circular cell or center coordinates, length and width for a rectangular cell are stored in a signature zone cell matrix. In the present embodiment, the representations for signature zone cells are saved in one or more look up tables.

With reference now to step 46 of FIG. 3, travel path compiler 36 of FIG. 2 combines incoming vehicle position information from the AVL system with the signature zone cell matrix to create a correlation value for each of the paths in the signature zone. As each vehicle position is reported there may be one, several, or no signature zone cells that contain the vehicle's reported position. Interpolation between successive vehicle position reports can also be used to provide a continuous set of positions to evaluate against the signature zone cells. The correlation values can be accumulated while the vehicle remains in the signature zone and the totality of correlation information may be used to make the decision as to which path to assign to the vehicle. Alternatively, decision information may be updated with each reported position as the vehicle passes through the signature zone and a decision on the vehicles path made when sufficient information has been accumulated to simultaneously select one path while ruling out all others.

With reference next to step 48 of FIG. 3, speed and direction compiler 39 of FIG. 2 the position information in each signature zone cell can be augmented with many types of additional information that may aid in the path decision. The vehicle's velocity and altitude are two possibilities. Velocity can be used as heading and speed information that is correlated with heading and speed information associated with a path through the signature zone. Speed, heading, and altitude correlation values may be modified to take into consideration speed limits, the curvature of each path, path geometry, expected vehicle dynamics based on mathematical formulas or modeled from collected AVL data.

Figure 8:
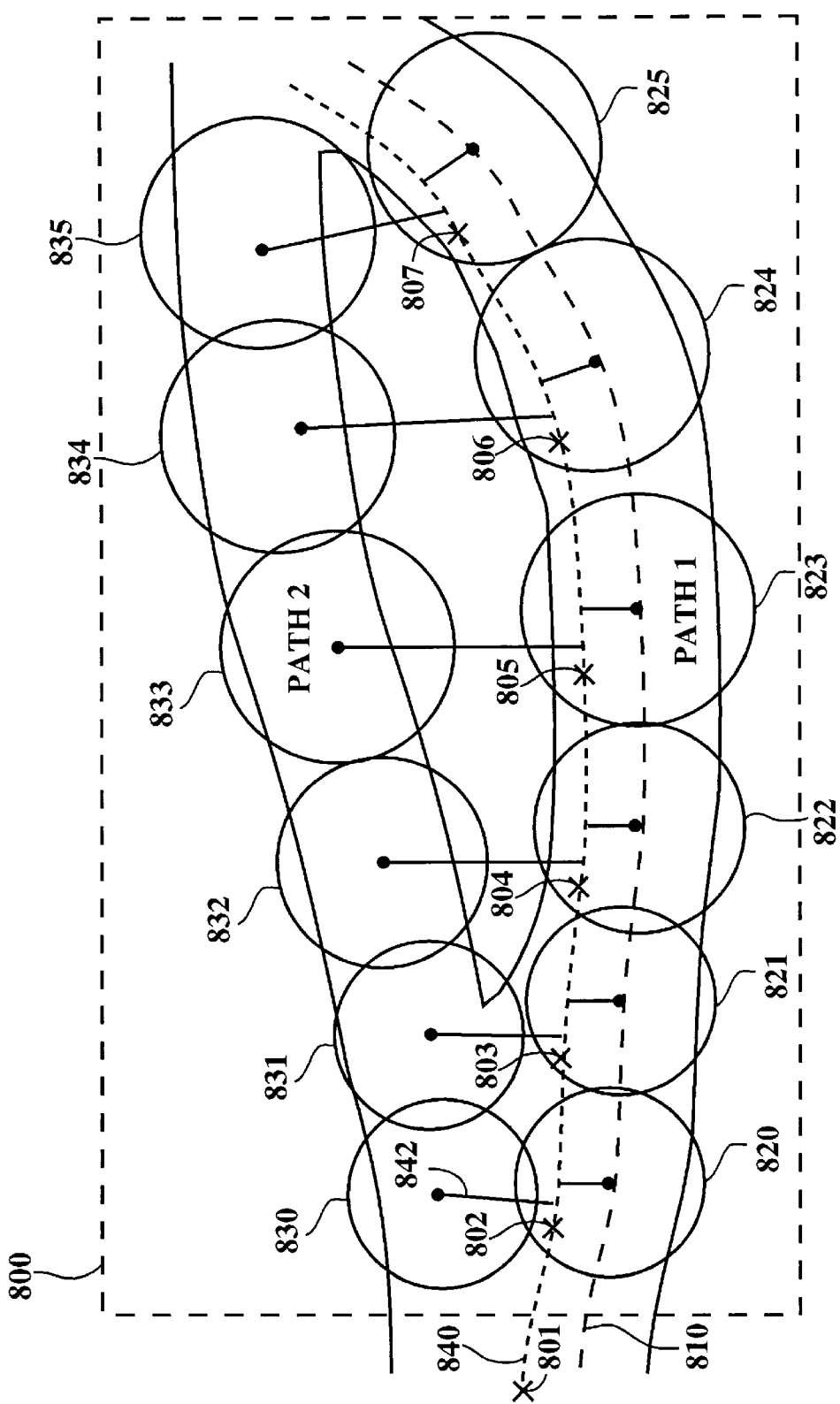
FIG. 8 is a schematic diagram of one embodiment of the position and velocity matrix correlation computation in accordance with the present claimed invention.

With reference to FIG. 8, one possible embodiment of the position correlation matrix compiler 46, the velocity correlation matrix compiler 48, and the path determination 52 of FIG. 3 can be described by the following example.

The signature zone 800 of FIG. 8 has been used in creating signature zone cells for path 1, 820 through 825, and path 2, 830 through 835. The actual path of the vehicle 810 lies follows path 1 in this particular example and the periodic reports of the vehicles position to the AVL system, 801 through 807, will not exactly reflect the vehicle path 810 but have some position and velocity errors inherent in the use of GPS for calculating positions. As a position value is reported such as 803 the path between the previously reported position, 802, and the current reported position, 840, is computed. The geographic cell matrix, computed in 44, is searched for any signature zone cells that have shortest distance to the reported path segment 840 lying within the reported path segment 840. In this example, cell 830 of path 2 has a distance 842 and cell 820 of path 1 has a distance 841 that meet these conditions. Using reported or modeled estimates of the statistics for position accuracy of the GPS-AVL position system, a probability can be computed for each of the zones 820 and 830 and stored in the positional correlation matrix 46.

The position and velocity correlation matrices are used to determine the vehicles path through the signature zone. This decision can be checked incrementally as each entry in the correlation matrices is computed or checked only once upon exiting the signature zone depending on the implementation of the particular system. Possible decision methods include but are not limited to voting schemes, cumulative probability computations, probability thresholding, hypothesis testing, and other similar methods well known to those versed in the art. Many of these decision methods provide a confidence level that may be reported to the AVL-CAD system.

With reference now to step 52 of FIG. 3, for those location coordinates corresponding to a location within a signature zone cell, the path and the accuracy of the path determination is calculated. A comparator such as comparator 38 shown in FIG. 2 compares the location coordinates received from each vehicle with the location coordinates in the signature zone cell matrix as determined in step 44. If the coordinates match coordinates within the signature zone cell matrix, the vehicle is located in a signature zone cell. A comparator such comparator 38 shown in FIG. 2, in conjunction with vehicle path determination generator 40 also shown in FIG. 2 compares the correlation values for each alternate path so as to determine the most likely path. Vehicle path determination generator 40 also calculates the accuracy of a determination of a particular path. The calculation of accuracy may be made by any of a number of known mathematical calculations. For example, accuracy may be determined using the center point of each signature zone cell and performing a standard circular error probability analysis. In signature zones where speed and direction data is necessary to determine the path taken by a particular vehicle, correlation values from the speed and direction matrix are used to calculate the path of the vehicle. As shown by step 54, once the path is determined, information as to the determined path is transmitted to the CAD system. This information may include the accuracy of the path determination as determined in step 52. In one embodiment, the reported information is displayed, for example, on a display such as display device 22 of FIG. 2. Since the CAD operator is aware of the travel path taken by each vehicle, CAD system operators do not need to use other resources (such as direct communication) to determine the location of each vehicle. As a result, the present invention simplifies CAD system operator tasks.

Referring back to step 52 of FIG. 3, subsequent position coordinates are received from the vehicle, the position coordinates are compared to the values in signature zone cell matrix 44 and the process of calculating the vehicle's path and the accuracy of the determined path is repeated. Updated path determination data and accuracy data is then provided to the CAD system. Each time that a subsequent position coordinate is received that is within the signature zone of interest, the determination of path and the accuracy of the determination may be revised by an analysis of prior location coordinates and correlation values received from the vehicle during its path through the signature zone of interest. Thus, with each subsequent location that falls within a signature zone cell in a signature zone, the accuracy of the determination of path increases.

With reference next to step 54 of FIG. 3, the present invention provides a indication of the determined path to AVL system and when a CAD system is used an indication of path is also transmitted to the CAD system operator. In the present embodiment, vehicle path determination generator 40 of FIG. 2, displays, on a graphic display of the AVL system or the AVL portion of a CAD system a path identifier for each vehicle. The travel path identifier for each vehicle displays a label corresponding to the then current travel path when a vehicle is located in a signature zone or within a multi-level structure. The path identifier could include the display of labels corresponding to alternate paths within each signature zone. In that event, the path AVL augmentor 34 also supplements the AVL system with path labels corresponding to alternate paths within each signature zone. For example, for a signature zone located within an airport, path labels for alternate paths could be "GATE 1 DEPARTURES" or alternatively, "GATE 1 ARRIVALS". The path labels would be displayed in the path identifier portion of each vehicle's AVL data whenever it is determined that a particular travel path is taken. The present invention is also well suited to other vehicle path indication methods including but not limited to using voice synthesis logic to audibly indicate the path taken by a vehicle, and the like.

Correlation values are shown to be determined by reference to a matrix containing correlation values for each set of coordinates stored in step 45. However, alternatively, correlation values could be determined mathematically each time a vehicle position within a signature zone cell is encountered. An analysis such as a least squares analysis using the center of each possible travel path as each travel path passes through a particular signature zone cell could be used to determine path and accuracy of the path determination.

Figure 7:
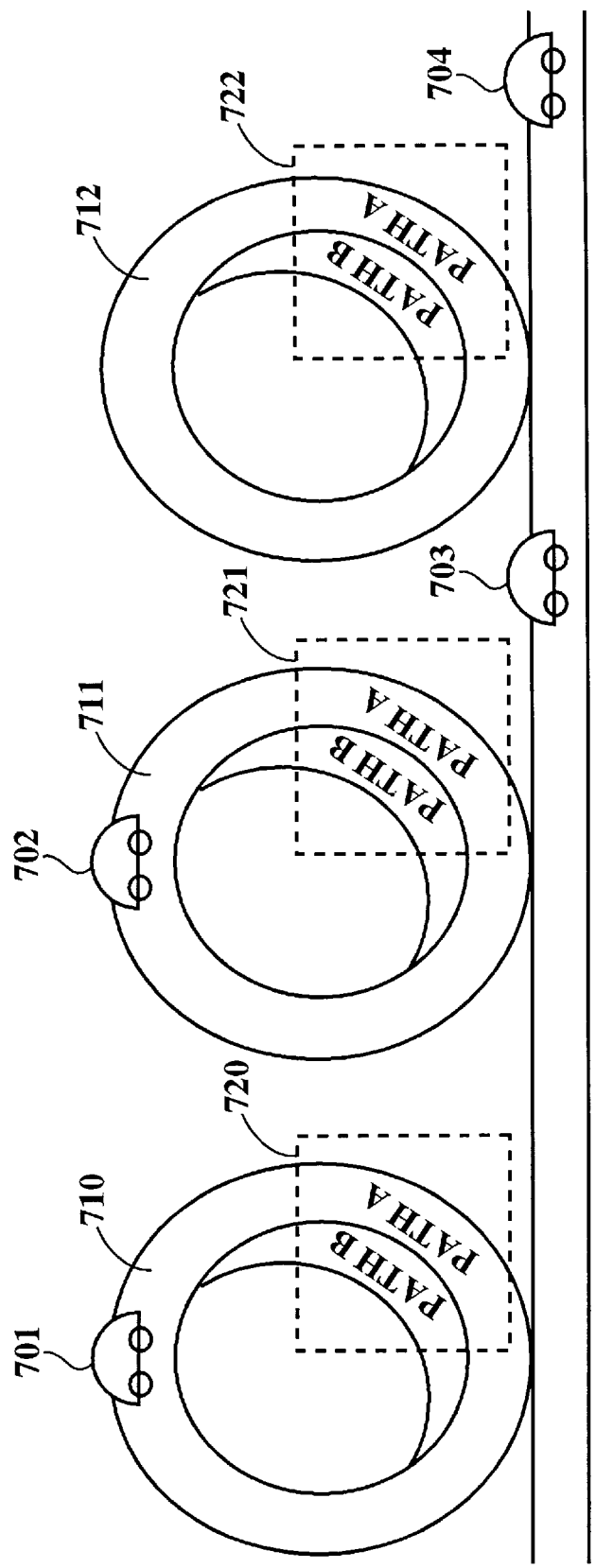
FIG. 7 is a schematic diagram of a geographic region including multi-level structures and signature zones and vehicles in accordance with the present claimed invention.

FIG. 7 shows a representation of vehicles 701–704 in a region containing multi-level structures 710–712. Multi level structures 710–712 are illustrated as arrival and departure areas of an airport. Signature zone 720 identifies vehicles traveling through multi-level structure 710. Each of the paths in signature zone 720 which are to be distinguished have labels identifying the particular path. Path A is identified by the label "GATE 1 ARRIVALS" and path B is identified by the label "GATE 1 DEPARTURES." Similarly path A and path B in multi-level structure 711 are distinguished as vehicles pass through signature zone 721. For multi-level structure 711, path A is identified by the label "GATE 2 ARRIVALS" and path B is identified by the label "GATE 2 DEPARTURES." For multi-level structure 712, signature zone 722 identifies path A identified by the label "GATE 3 ARRIVALS" and path B is identified by the label "GATE 3 DEPARTURES." Although the present embodiment assigns a unique identifier to each travel path, generic labels such as simply "ARRIVALS", "DEPARTURES", "UPPER LEVEL" and "LOWER LEVEL" could also be used. Furthermore, though each of signature zones 720–722 include signature zone cells, the signature zone cells are not shown in FIG. 7 for the purposes of clarity.

As shown in FIG. 7, AVL augmentor 34 of FIG. 2 supplements the AVL portion of CAD system 1 of FIG. 1, such that the AVL system reports the latitude, longitude, elevation, time, speed, heading and path indication of vehicles 701–704. Since the designated label for path A is "GATE 1 ARRIVALS" and since vehicle 701 is located within path A, the path indication for vehicle 701 reads "GATE 1 ARRIVALS." Likewise, AVL augmentor 34 caused the AVL system to report the travel path of vehicles 702–704. Since the designated label for path B of signature zone 721 is "GATE 2 DEPARTURES" and since vehicle 702 is located within path B, the path indication for vehicle 702 reads "GATE 2 DEPARTURES." Vehicles 703 and 704 are not within either a signature zone or a multi-level structure. Therefore, the path determination system does not assign any particular path for vehicles 703–704. The label used when no path is indicated may be a blank label or a label such as "NO DESIGNATED PATH." As the vehicles move into and out of different signature zones and multi-level structures, AVL augmentor 34 continues to supplement the AVL system with the current travel path information for each of the monitored vehicles. The present invention is also well suited for use with station based or posted vehicles. In such a case, AVL augmentor 34 continues to supplement the AVL system or the AVL portion of a CAD system such as CAD system 1 with the travel path corresponding to the location at which the vehicle is based or posted until the vehicle leaves the station or post.

In another approach for determining vehicle travel path, path determination generator 40 of FIG. 2 is well suited to using operationally determined correlation values. In such an instance, vehicle travel path correlation matrix compiler 36 uses previously recorded reports of AVL data corresponding to travel through signature zones for known travel paths. Such an approach is used when the present invention is employed with an existing CAD or AVL system which has been recording AVL data. Vehicle response speed and direction matrix compiler 39 is also well suited to using operationally determined speed and direction information to upgrade previous predictions of a vehicle travel path. That is, in the present embodiment, the present invention records actual vehicle travel paths and speed and direction information. These operationally determined readings are used to replace correlation values and speed and direction values which appear inaccurate. In so doing, the present AVPD system becomes more accurate the longer it is used. Thus, the present invention is a self-learning system whose accuracy improves with use.

The present invention is also well suited to using operationally determined travel paths to amend or reconstruct signature zone cells. For example, if a vehicle travel path is not correctly or accurately determined using the derived signature zone cells, the cell derivation process is repeated so as to reflect operationally determined factors. In such an instance, the present invention is well suited to amending the size, or location of one or more of the previously derived signature zone cells. Thus, the accuracy of the present invention becomes even greater the longer it is used.

The present invention is also well suited to using operationally determined response times to determine whether travel path correlation matrix compiler 36 should construct an alternate matrix. For example, operationally determined vehicle travel paths may vary greatly under certain conditions such as, for example, inclement weather, rush hour traffic, and the like. If such variations occur, travel path correlation matrix compiler 36 is well suited to compiling at least a second correlation matrix. The second correlation matrix is employed in the AVPD system of the present invention time when conditions warrant. In such an embodiment, the operator of the AVL system or the AVL portion of a CAD system such as system 1 of FIG. 1 would select the matrix which corresponds to current conditions. Thus, the present invention is well suited to accurately compensating for conditions that may affect determination of vehicle travel path.

Although the present invention is described with reference to use with both an AVL system and a CAD system, the present invention is well suited to use in an AVL system that does not include CAD or any type of dispatch. For example, the present invention could be incorporated into a AVL system that simply monitors the location of vehicles.

Though the present invention is described with reference to determining location as latitude, longitude, and altitude, the present invention is also well suited for use in a position determination system which determines location information using a different coordinate system. Thus, for example a differential GPS system which uses a local coordinate system could be used to accurately determine position.

Though the present invention is described for use in situations where GPS performance is reduced, the present invention is also well suited for use in any situation where GPS alone is not sufficient to discern travel path. For example, the present invention is well suited for determining travel path on nearly coincident roadways.

In summary, the present invention is used in the following manner. For geographic regions containing multi-level structures, travel paths through the multi-level structures may be discerned by assigning a signature zone to each multi-level structure. The signature zone is located such that the travel paths of vehicles approaching each multi-level structure may be discerned by evaluation of information transmitted from the vehicle as it travels through the signature zone. Each path through a multi-level structure which is to be discerned is given a label that identifies the path. Geographic cell derivator 32 of FIG. 2 derives a plurality of signature zone cells within each signature zone such that the signature zone cells correspond to possible travel paths and location coordinates of positions within each cell are stored in a matrix. Correlation matrix compiler 36 of FIG. 2 calculates correlation values corresponding to possible travel paths within signature zones and stores the correlation values in a matrix. Speed and direction matrix compiler 39 calculates speed and direction correlation values and stores them in a matrix. AVL augmentor 34 supplements an AVL system or the AVL portion of a CAD system with the path identifier for each monitored vehicle. Path determination generator 40 in conjunction with comparator 38 determines whether the positions of monitored vehicles are within a signature zone cell. If a vehicle is located in a signature zone cell, the path taken by the vehicle is determined and the path is then communicates to the AVL system or the AVL portion of a CAD system.

Thus, the present invention provides a system which swiftly and automatically determines which of a plurality of paths is taken by a vehicle through an area having structures that prevent reception of GPS signals, a system which can function in conjunction with an existing AVL or CAD system, and a system which reduces CAD system operator decision making processes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An automatic vehicle path determination system for determining the path taken by a vehicle travelling through an area having structures that inhibit reception of position locating signals, said system comprising:

a signature zone cell database including a plurality of signature zone cells corresponding to travel paths within a signature zone, said signature zone cell database also including a plurality of location coordinates, said plurality of location coordinates corresponding to locations within said plurality of signature zone cells; and a travel path matrix including a plurality of correlation values, said plurality of correlation values corresponding to said plurality of location coordinates such that the travel path of a vehicle can be determined by comparing values in said travel path matrix for ones of said plurality of location coordinates in said signature zone cell database corresponding to position information received from said vehicle.

2. The automatic vehicle path determination system of claim 1 further wherein said automatic vehicle path determination system further comprises a speed and direction matrix, said speed and direction matrix comprising correlation values corresponding to speed and direction indications for locations within said signature zone cells.

3. The automatic vehicle path determination system of claim 1 wherein said automatic vehicle path determination system is integral with an automatic vehicle location system.

4. The automatic vehicle path determination system of claim 3 further comprising:

a computer aided dispatch system coupled to said automatic vehicle location system; and wherein said automatic vehicle path determination system is coupled to said computer aided dispatch system and said automatic vehicle location system, said automatic vehicle path determination system for communicating to said computer aided dispatch system the path of a vehicle approaching a area in which the performance of said automatic vehicle location system is reduced.

5. In a computer system including a processor coupled to a bus, and a memory unit coupled to said bus for storing information, a computer-implemented method for indicating which of a plurality of travel paths is taken by a vehicle, said computer-implemented method comprising the steps of:

a.) designating a plurality of signature zone cells corresponding to travel paths that extend through an area having structures that inhibit reception of position locating signals;

b.) calculating correlation values corresponding to locations within said signature zone cells;

c.) incorporating signature zone cell information into an automatic vehicle path determination system;

d.) incorporating correlation value information into said automatic vehicle path determination system;

e.) determining the travel path of a vehicle passing through said signature zone cells by comparing position information from said vehicle to said signature zone cell information and comparing said correlation information corresponding to said position information; and f.) communicating to said automatic vehicle location system which travel path is taken by vehicles passing through one of said signature zone cells such that position information for each of a plurality of vehicles monitored by said automatic vehicle path determination system further comprises an indication of the travel path of vehicles passing through said signature zone cells.

6. The computer-implemented method as recited in claim 5 wherein said step of designating a plurality of signature zone cells further comprises the step of:

determining diverging travel paths leading to area having structures that inhibit reception of position locating signals; and assigning a plurality of signature zone cells to each diverging travel path.

7. The computer-implemented method as recited in claim 6 wherein step a) further comprises the step of:

determining the amount of divergence between different travel paths leading to said area having structures that inhibit reception of position locating signals.

8. The computer-implemented method as recited in claim 5 further comprising the step of:

assigning a plurality of labels to travel paths that pass through said area having structures that inhibit reception of position locating signals such that said plurality of labels identify the travel paths that pass through said area having structures that inhibit reception of position locating signals.

9. The computer-implemented method as recited in claim 8 wherein said step of communicating to said computer aided dispatch system which travel path is taken by vehicles passing through one of said signature zone cells further comprises communicating the label corresponding to the travel path taken by vehicles passing through one of said signature zone cells such that position information for each of a plurality of vehicles monitored by said automatic vehicle path determination system further comprises the display of the label corresponding to the travel path of vehicles passing through said signature zone cells.

10. The computer-implemented method as recited in claim 6 wherein step a) further comprises the step of:

determining the number of signature zone cells to be assigned to each travel path.

11. The computer-implemented method as recited in claim 10 wherein said step of assigning a plurality of signature zone cells to each diverging travel path further comprises the step of:

storing location coordinates corresponding to locations within each signature zone cell within a matrix.

12. The computer-implemented method as recited in claim 5 wherein said step of calculating correlation values corresponding to locations within said signature zone cells includes the steps of:

performing a mathematical function on each location coordinate located within a signature zone cell so as to determine how closely the location coordinate corresponds to each possible travel path.

13. The computer-implemented method as recited in claim 12 wherein said step of performing a mathematical function on each location coordinate located within a signature zone cell so as to determine how closely the location coordinate corresponds to each possible travel path further comprises:

performing a least squares mathematical function on each location coordinate located within a signature zone cell so as to determine how closely the location coordinate corresponds to each possible travel path.

14. The computer-implemented method as recited in claim 13 wherein said step of determining the travel path of vehicles passing through said signature zone cells further includes the step of:

determining a travel path for a vehicle passing through a signature zone by comparing all correlation values corresponding to position information received from said vehicle as said vehicle passes through said signature zone.

15. The computer-implemented method as recited in claim 14 wherein said step of determining the travel path of vehicles passing through said signature zone cells further includes the step of:

determining an estimated accuracy for a vehicle passing through a signature zone by comparing all correlation values corresponding to position information received from said vehicle as said vehicle passes through said signature zone.

16. The computer-implemented method as recited in claim 15 wherein said step of determining the travel path of vehicles passing through a signature zone further includes the steps of:

comparing said determined estimated accuracy to a minimum accuracy variable so as to determine whether or not there is a sufficiently high likelihood that the vehicle is on a given travel path.

17. A computer-usable medium having computer-readable program code embodied therein for causing a computer to perform the steps of:

a.) designating a plurality of signature zone cells corresponding to travel paths that extend through an area having structures that inhibit reception of position locating signals;

b.) calculating correlation values corresponding to locations within said signature zone cells;

c.) incorporating signature zone cell information into an automatic vehicle path determination system;

d.) incorporating correlation value information into said automatic vehicle path determination system;

e.) determining the travel path of a vehicle passing through said signature zone cells by comparing position information from said vehicle to said signature zone cell information and comparing said correlation information corresponding to said position information; and f.) communicating to said automatic vehicle location system which travel path is taken by vehicles passing through one of said signature zone cells such that position information for each of a plurality of vehicles monitored by said automatic vehicle path determination system further comprises an indication of the travel path of vehicles passing through said signature zone cells.

18. The computer-usable medium of claim 17 wherein step c) further comprises the step of:

c1) storing position coordinates within a matrix.

19. The computer-usable medium of claim 18 wherein step d) further comprises the step of:

d1) storing correlation value information within a matrix.

* * * * *